Sept. 15, 1970  J. A. HOUTMAN  3,528,171
METHOD OF MANUFACTURING A STATOR ASSEMBLY
FOR AN INDUCTION MOTOR
Original Filed July 26, 1968
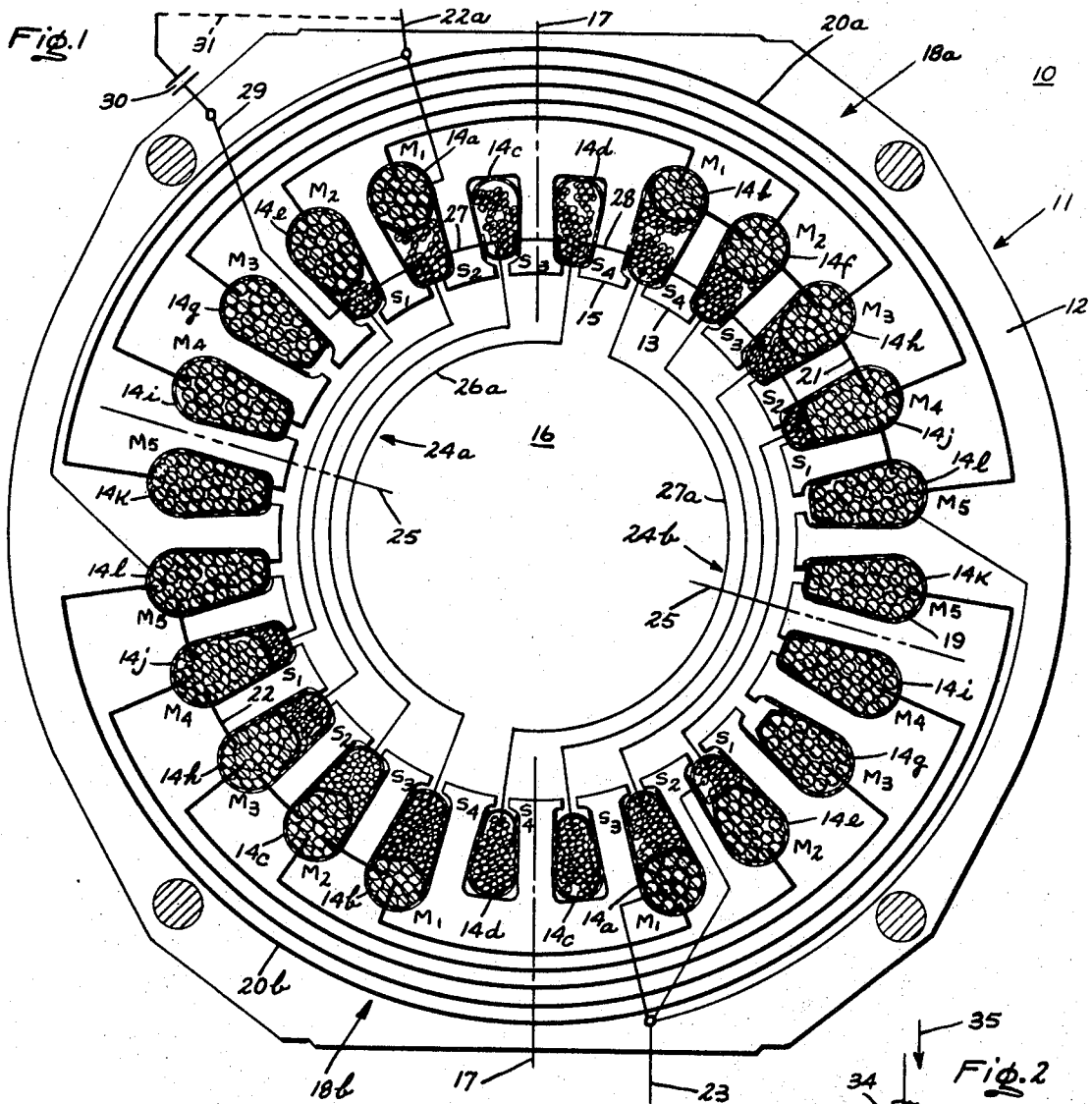
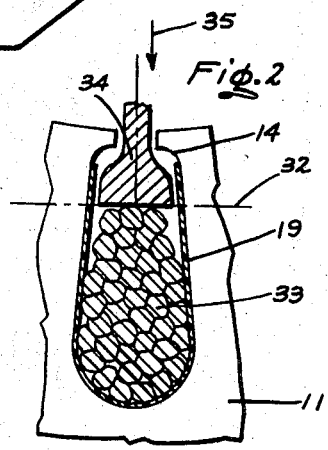
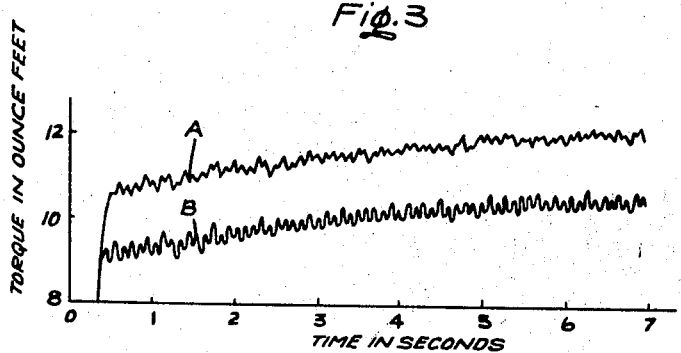
INVENTOR.
Jack A. Houtman,
BY
Attorney.

12# United States Patent Office 3,528,171
Patented Sept. 15, 1970

3,528,171
METHOD OF MANUFACTURING A STATOR ASSEMBLY FOR AN INDUCTION MOTOR
Jack A. Houtman, Holland, Mich., assignor to General Electric Company, a corporation of New York
Original application July 26, 1968, Ser. No. 747,870. Divided and this application May 29, 1969, Ser. No. 828,969
Int. Cl. H02k *15/00*
U.S. Cl. 29—596        6 Claims

ABSTRACT OF THE DISCLOSURE

A method of manufacturing a stator assembly to provide an induction motor with improved locked rotor torque characteristics. At least first and second phase windings are carried in slots of a core, with each winding including a plurality of coils formed of a preselected number of turns of wire to provide a predetermined number of angularly spaced apart poles. The at least first and second phase windings are arranged in the slots of the core, with at least one side of certain coils of the second phase winding sharing the same slots with at least one side of certain coils of the first phase winding, and with the number of turns of wire in each of the coils being preselected so that the algebraic product of the third harmonic effective first and second phase winding turns is in the range from a relatively small positive number to a relatively large negative number. Prior to the arranging of the second phase winding in the slots, the at least one side of certain coils of the first phase winding is compacted by the application of generally radial forces in the slots of the core of sufficient magnitude, for instance 6,500 pounds per square inch, to provide a space factor for the at least one side of at least 80%.

CROSS-REFERENCE OF RELATED APPLICATION

This is a division of my copending application Ser. No. 747,870 filed July 26, 1968.

BACKGROUND OF THE INVENTION

Field of the invention

This invention relates generally to the manufacture of induction motors of the distributed winding type, and more particularly to an improved method of manufacturing stator assemblies having such windings to provide the attainment of increased locked rotor torque.

DESCRIPTION OF THE PRIOR ART

Single phase, alternating current induction motors of the distributed winding type conventionally include a main field winding and an auxiliary or starting field winding, the two windings being angularly displaced on the stator core and being energized, respectively, by phase-displaced currents, in order to provide a torque at zero speed, referred to as locked rotor torque (LRT). The phase displacement of the main and starting winding currents is conventionally provided by the incorporation of dissimilar impedance in the respective winding circuits. In one form of single phase induction motor, referred to as "resistance-split," the starting winding is wound to have a higher resistance than the main field of winding and may have additional resistance connected in series therewith, the difference in the resistance of the respective main and starting winding circuits thus providing the requisite phase displacement. In another common form of single induction motor, the phase displacement is provided by means of a capacitor coupled in series with the starting winding. In some single phase motors, the starting winding is disconnected from the circuit and is thus deenergized when the motor reaches a predetermined speed, as by a speed-responsive switch or a current-responsive relay. In other motors, particularly of the capacitor-start type, the starting winding and its associate capacitor remain in the circuits, such motors being referred to as being of the permanent-split capacitor type.

In these motors it is generally desirable to provide a locked rotor torque as high as possible. An increase in locked rotor torque has commonly been accomplished by increasing the phase displacement between the main and starting winding currents. In the case of motors of the permanent-split capacitor type, this has required the use of a larger, and thus more expensive, capacitor, thus resulting in a significant increase in the total cost of the motor. It is thus desirable to increase the locked rotor torque without an accompanying significant increase in the overall cost of the motor.

In Pat. No. 3,200,317 to Allen A. Brammerlo, assigned to the assignee of the present application, there is disclosed a stator winding arrangement for use in a single phase induction motor which provides an increase in the starting or locked rotor torque by the distribution of the currents in wires forming the coils of the main and starting windings. In Pat. No. 3,348,183 to Ralph D. Hodges and Francisco C. Avila, and assigned to the assignee of the present application, there is closed a method of compacting an insulated coil.

SUMMARY OF THE INVENTION

It is accordingly an object of the invention to provide an improved method of manufacturing a stator assembly for an induction motor.

Another object of the invention is to provide an improved method of manufacturing a stator assembly having distributed windings which provide increased locked rotor torque over that provided by prior methods of manufacture.

In one form of the present invention, I provide an improved method of manufacturing a stator assembly for use in an induction motor having improved locked rotor torque characteristics. The stator assembly has a slotted magnetic core member carrying a first phase winding in predetermined slots for forming a predetermined number of first phase winding poles. A second phase winding is carried in predetermined slots to produce the same predetermined number of second phase winding poles respectively angularly displaced from the first phase poles. In one form of the method, turns of wire are distributed in the slots to provide a plurality of concentric coils of different pitches in the phase winding poles, with at least one side of certain coils of the respective first phase winding poles sharing the same slot as at least one side of coils of the second phase winding poles. The number of turns in the coils are preselected so that in the formula:

$$\Delta LRT = \frac{-K_3 N_{3es} + K_5 N_{5e} N_{5es} - \ldots + \sin\left(\frac{2}{n}\right)}{K_n K_{ne} K_{nes}}$$

where:

$\Delta LRT$ = change in locked rotor torque
$n$ = order of harmonic
$K_n$ = positive constants, functions of $n$, for a given design
$K_{ne}$ = effective first phase winding turns for the $n^{th}$ harmonic
  = $M_1 \sin n\alpha_1 + M_2 \sin \alpha_2 + \ldots M_p \sin n\alpha_p$
$M_p$ = number of turns in the respective first phase coil
$\alpha_p$ = ½ the coil pitch angle of the respective first phase coil in fundamental electrical degrees
$N_{nes}$ = effective second phase winding turns for the $n^{th}$ harmonic
  = $S_1 \sin n\sigma_1 + S_2 \sin n\sigma_2 + \ldots + S_q \sin n\sigma_q$
$S_q$ = number of turns of the respective second phase coil
$\sigma_q$ = ½ the coil pitch angle of the respective second phase coil in fundamental electrical degrees The factor $K_3 N_{3e} N_{3es}$ is a minimum and the factor $K_5 N_{5e} N_{5es}$ is a maximum. Prior to distributing the second phase winding in the slots, the at least one side of certain coils of the first phase winding is compacted by generally radially applied forces of at least approximately 6,500 pounds per square inch with such certain coils being disposed in the slots to effect a space factor of at least 80%.

BRIEF DESCRIPTION OF THE DRAWINGS

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is a cross-sectional view, partially schematic, illustrating a single phase, alternating current induction motor stator core member and its winding circuitry incorporating the preferred embodiment of the present invention;

FIG. 2 is an enlarged fragmentary view of one of the coil-accommodating slots of the stator core member of FIG. 1, showing compaction of a side of one of the main winding coils prior to installation of a side of a starting winding coil in the slot; and FIG. 3 is a graph illustrating a representative locked rotor torque curve for the stator member of FIG. 1, and a locked rotor torque curve for a comparable prior art stator member.

DESCRIPTION OF THE PREFERRED EMBODIMENT

Referring now to FIG. 1 of the drawing, the present invention is shown as applied to the manufacture of a stator assembly for a two pole permanent-split capacitor start single phase induction motor. The stator assembly, generally indicated at 10, comprises a stator core member 11 conventionally formed of a stacked plurality of relatively thin laminations of magnetic material. The stator core member 11 includes a yoke portion 12 having a plurality of equally spaced-apart teeth 13 extending radially inwardly from yoke portion 12 to the fine winding slots 14 therebetween. The inner ends 15 of teeth 13 mutually define a bore 16 for receiving the usual squirrel-cage rotor (not shown). In the illustrated embodiment, stator core member 11 is provided with twenty-four equally spaced-apart winding slots 14.

In the illustrated embodiment, a main running field winding, the first phase winding, is provided disposed in certain predetermined slots 14 so as to form two diametrically opposite main poles aligned on the axis shown by the dashed line 17. The main winding is divided into two sections 18a, and 18b, each forming one of the main poles, and each comprising five concentric coils of progressively greater pitch. More particularly, the five coils of the main windings 18a and 18b are respectively designated $M_1$, $M_2$, $M_3$, $M_4$, and $M_5$. Considering the main winding section 18a, the smallest pitched coil $M_1$ is positioned in slots 14a and 14b equally spaced on opposite sides of the axis 17 with slots 14c and 14d therebetween. The second main coil $M_2$ is positioned in slots 14e and 14f, coil $M_3$ is positioned in slots 14g and 14h, coil $M_4$ is positioned in slots 14i and 14j, and coil $M_5$ is positioned in slots 14k and 14l. The main winding coils $M_1$ thru $M_5$ of the other main winding section 18b are similarly positioned in corresponding slots 14, as shown in FIG. 1. Each of the slots 14 is shown as having a conventional slot insulator 19 therein.

The sides of each main winding coil positioned in the respective pair of slots 14 are joined by end turns projecting from the respective opposite faces of the core member 11, as shown schematically at 20a and 20b in FIG. 1. Further, the main winding coils $M_1$ thru $M_5$ of each section 18a and 18b are interconnected in series in conventional fashion, as shown schematically at 22. In the illustrated embodiment, the two main winding sections 18a and 18b are connected in parallel. Thus, one end of coil $M_1$ of section 18a is connected to a first external lead $22_a$ and an end of coil $M_5$ is connected to the other external lead 23, and likewise an end of coil $M_1$ of section 18b is connected to external lead 23 and an end of coil $M_5$ is connected to lead 22 as shown.

An auxiliary or starting field winding, a second phase winding, is similarly disposed in predetermined slots 14 and forms two auxiliary poles which are respectively angularly displaced from the main poles by predetermined angular amount. In the illustrated exemplification the two windings are distributed to provide a non-quadrature type winding arrangement. That is to say, the radial centerline for the auxiliary winding poles are displaced on the stator core from the centerlines of the adjacent main winding poles at electrical angles other than ninety (90) electrical degrees. More specifically, the starting winding is divided into two sections 24a and 24b which respectively form the diametrically opposite auxiliary poles which are aligned on the axis shown by the dashed line 25. Each of the starting winding sections 24a and 24b comprises four concentric coils of progressively greater pitch respectively designated as $S_1$, $S_2$, $S_3$ and $S_4$. More particularly, as will be seen in FIG. 1, one side of the larger pitched starting winding coils $S_3$ and $S_4$ are the sole occupants of slots 14c and 14d, the other sides of coils $S_3$ and $S_4$ respectively sharing slots 14f and 14b with one side of main winding coils $M_2$ and $M_1$. Further, one side of the smaller pitched winding coils $S_1$ and $S_2$ respectively share slots 14e and 14a with the other sides of the main winding coils $M_2$ and $M_1$, the other sides of the starting winding coils $S_1$ and $S_2$ respectively sharting slots 14j and 14h with one side of main winding coils $M_4$ and $M_3$, as shown. It will be seen that the other sides of main winding coils $M_3$ and $M_4$ are the sole occupants of slots 14g and 14i, and that the main winding coils $M_5$ are the sole occupants of slots 14k and 14l.

The sides of the starting winding coils $S_1$ thru $S_4$ of each of the starting winding sections 24a and 24b are joined by end turns extending outwardly from each face of the stator core 11, as shown schematically at 26a and 27a. The concentric coils $S_1$ thru $S_4$ of each of the starting winding sections 24a and 26b are connected in series in conventional fashion, as shown schematically at 27, and the two sections 24a and 24b are in turn connected in series, as shown schematically at 28. One end of coil $S_1$ of start winding section 24b is connected to external lead 23 while one end of coil $S_1$ of start winding section 24a is connected to external lead 29 to which external starting capacitor 30 is connected. In a permanent-split capacitor motor circuit, capacitor 30 is permanently coupled to external lead $22_a$, as shown by the dashed line 31, it being readily understood that a speed-responsive switch or a current-responsive relay may be employed for opening connection 31 when the motor has reached a predetermined speed.

The air gap magneto-motive force (mmf), due to the concentric coils of the main and starting windings, can be described mathematically as a Fourier series of space harmonics. In the illustrated embodiment in which both poles formed by each winding are alike and are symmetrical about their respective axes 17 and 25, and in which each coil of the respective windings carries the same current, the Fourier series consists of a fundamental frequency term and an infinite series of odd order space harmonics; the windings have both half-wave and quarter-wave symmetry and thus only the odd order harmonics exist. For the main winding 18 of the illustrated embodiment, the Fourier series would be:

(1)
$$MMF_{main} = \frac{4\sqrt{2}}{\pi} I_m \cos \omega t [N_{1e} \cos \theta + N_{3e} \cos 3e \ldots + N_{ne} \cos n\theta]$$

where:

$I_m$=Root-mean-square (RMS) main winding current— amperes
$\omega$=line radian frequency
$t$=time—sec.
$\Theta$=air gap angle measured from radial centerline of main poles—fundamental electrical degrees
$n$=order of harmonic
(2) $N_{1e}$=fundamental effective main turns
$= M_1 \sin \alpha_1 + M_2 \sin \alpha_2 + \ldots M_p \sin \alpha_p$
(3) $N_{3e}$=third harmonic effective main turns
$M_1 \sin 3\alpha_1 + M_2 \sin 3\alpha_2 + \ldots + M_p \sin 3\alpha_p$
(4) $N_{ne}$=$n^{th}$ harmonic effective turns
$= M_1 \sin n\alpha_1 + M_2 \sin \alpha_2 + \ldots + M_p \sin n\alpha_p$
$\alpha_p$=½ coil pitch angle of the $p^{th}$ coil—fundamental electrical degrees
$M_p$=No. of turns in the $p^{th}$ coil A similar expression can be written for the start winding:

(5)
$$MMF_{start} = \frac{4\sqrt{2} I_s}{\pi} \cos(\omega t + \gamma)[N_{1es} \cos \beta + N_{3es} \cos 3\beta + \ldots N_{nes} \cos n\beta]$$

where:

$I_s$=RMS start winding current—amperes
$\alpha$=Angles of time displacement between main and start current
$\beta$=Air gap angle measured from centerline of start poles— fundamental electrical degrees
(6) $N_{1es}$=fundamental effective start turns
$= S_1 \sin \delta_1 + S_2 \sin \delta_2 + \ldots + S_q \sin \delta_q$
etc.
(7) $N_{nes}$=$n^{th}$ harmonic effective starts turns
$= S_1 \sin n\delta_1 + S_2 \sin n\delta_2 + \ldots + S_q \sin n\delta_q$
$S_q$=Start turns in $q^{th}$ coil
$\delta_q$=½ coil pitch angle of the $q^{th}$ coil—fundamental electrical degrees It can be shown that the change in locked rotor torque (LRT) is given by:

(8)
$$\Delta LRT = -K_3 N_{3e} N_{3es} + K_5 N_{5e} N_{5es}$$
$$- \ldots + \sin\left(\frac{n}{2}\right) - K_n N_{ne} N_{nes}$$

where K represents a positive constant for a given design.

For the twenty-four slot, two-pole stator of the illustrated embodiment having five coil main poles and four coil auxiliary poles, Equations 2 and 6 become:

(9)  $N_{1e} = .38M_1 + .61M_2 + .79M_3 + .92M_4 + .99M_5$ and

(10)  $N_{1es} = .61S_1 + .79S_2 + .92S_3 + .99S_4$

The expressions for the third and fifth harmonic effective turns from the Equations 4 and 7 are:

(11)  $N_{3e} = .92M_1 + .92M_2 + .38M_3 - .38M_4 - .92M_5$
(12)  $N_{3es} = .92S_1 + .38S_2 - .38S_3 - .92S_4$
(13)  $N_{5e} = .92M_1 - .13M_2 - .99M_3 - .38M_4 + .79M_5$
(14)  $N_{5es} = -.13S_1 - .99S_2 - .38S_3 + .79S_4$

Equations 9 and 10 above show that there are many combinations of numbers of turns for the main winding coil $M_1$ thru $M_5$ and for the starting winding coils $S_1$ thru $S_4$ that will yield the same values of fundamental effective main turns $N_{1e}$ and fundamental effective start turns $N_{1es}$. It will be readily seen from Equation 8 above that in order to maximum the value of LRT, it would be advantageous to arrange the turns of the main and starting winding coils so as to make the product $N_{3e} N_{3es}$ as negative as possible, and to make the product $N_{5e} N_{5es}$ as positive as possible, etc.

In the past, it has not been possible to obtain the advantages of winding turn distribution indicated by Equation 8 due to space limitations in the stator core at least ber slots, particularly slots which are shared by at least one side of both the main and starting winding coils or coils of different phases. For example, a 30-frame, 24-slot, two-pole stator having a winding circuit and arrangement shown in FIG. 1, and incorporating the teachings of the aforesaid Brammerlo patent, as the following turn distribution:

| $M_1$ | $M_2$ | $M_3$ | $M_4$ | $M_5$ | |
|---|---|---|---|---|---|
| 14 | 21 | 26 | 35 | 49 | $N_{1e} = 59.84$ |

| $S_1$ | $S_2$ | $S_3$ | $S_4$ | |
|---|---|---|---|---|
| 21 | 38 | 48 | 56 | $N_{1es} = 142.8$ |

The main winding coils of the stator were formed of copper wire and were non-compacted having a space factor of approximately 75%, space factor being calculated as 100 times the ratio of the circular-mil area of the insulated wires to the circular-mil area defined by the inside of the slot liner and a straight line tangent across the stator bore side of the wires, as shown by the dashed line 32 in FIG. 2.

The winding harmonics of the windings of the above stator, expressed as a percent of the fundamental effective turns, were found to be:

| Percent $N_{3e}$ | Percent $N_{3es}$ | (Percent $N_{3e}$ × Percent $N_{3es}$) |
|---|---|---|
| −4.56 | −8.44 | +38.49 |

| Percent $N_{5e}$ | Percent $N_{5es}$ | (Percent $N_{5e}$ × Percent $N_{5es}$) |
|---|---|---|
| 1.65 | −2.01 | −3.32 |

This stator, when tested with a conventional squirrel caged rotor, was found to have a locked rotor torque of 8.8 ounce-feet.

In the present situation, the number of turns of the main winding coils $M_1$ thru $M_5$ preferably progressively increase from the smallest pitched coil $M_1$ to at least the next-to-largest pitched coil $M_4$, and the number of turns of the starting winding coils progressively increases from the smallest pitched coil $S_1$ to the largest pitched coil $S_4$. Moreover, preselected sides of the main winding coils, which share a slot 14 with the side of a starting winding coil, are compacted after being positioned in the slots but before positioning of the respective start winding coil side in the same slots, in order to increase the space factor to at least 80%.

Referring particularly to FIG. 2, the side 33 of a main winding coil, after being positioned in a slot 14 of the stator core member 11, as by use of a conventional gun winder or conventional coil injection apparatus, is compacted as by means of a suitable tool 34 which applies radially outward force upon the coil side 33 in the direction shown by the arrow 35. As shown in FIG. 2, and as further described in the aforesaid Hodges et al. patent, the application of substantial compacting force upon the coil side formed of a plurality of insulated wires will form the individual wires from their original substantially circular section into non-circular, polygonal cross-section, without injury to the wire insulation, thereby substantially reducing the voids between the individual wires and substantially increasing the space factor. It will be readily apparent that the compacting force required will be less when insulated aluminum wire is employed than will be required in the case of copper wire. In the case of a 30-frame, 24-slot stator core having the slot configuration hsown in FIG. 1, it has been found that 16 gage insulated aluminum wire is employed for the main winding coils can be compacted in the slots to provide an 80% space factor with the application of approximately a compacting force of 6,500 lbs. per square inch, and to provide a 90% space factor by the application of the compacting force of approximately 11,000 lbs. per square inch.

The same 30-frame, 24-slot, two-pole stator of the exemplification, when manufactured in accordance with one form of the invention, was one with the winding configuration shown in FIG. 1 and with the following distribution of main and starting winding coil turns:

| $M_1$ | $M_2$ | $M_3$ | $M_4$ | $M_5$ | |
|---|---|---|---|---|---|
| 15 | 24 | 31 | 39 | 39 | $N_{1e}=59.82$ |

| $S_1$ | $S_2$ | $S_3$ | $S_4$ | |
|---|---|---|---|---|
| 18 | 33 | 46 | 63 | $N_{1es}=142.1$ |

Here, the main winding coils $M_1$ thru $M_4$ were compacted, as above described (except in slots 14a and 14e) to provide the space factor of approximately 80% before placement of the starting winding coil $S_1$ thru $S_4$. The winding harmonics of these windings, again expressed as a percent of the fundamental effective turns, were found to be as follows:

| Percent $N_{3e}$ | Percent $N_{3es}$ | (Percent $N_{3e}$ × Percent $N_{3es}$) |
|---|---|---|
| −.853 | −10.9 | +9.29 |

| $N_{5e}$ | $N_{5es}$ | (Percent $N_{5e}$ × Percent $N_{5es}$) |
|---|---|---|
| −.667 | −.378 | +.252 |

Referring to the corresponding harmonics for the stator having the uncompacted windings, as set forth above, it will be seen that in reducing the product $N_{3e}N_{3es}$ from +38.49 to +9.29, that product has been rendered more negative, i.e. less positive, and likewise that in increasing the product $N_{5e}N_{5es}$ from −3.32 to +.252, that product has been rendered more positive. This stator, when tested with the same conventional squirrel cage rotor, provided a locked rotor torque of 10.1 ounce-feet, an increase of approximately 15% over that of the motor having the uncompacted windings. It will be understood that the sign in connection with the product $N_{3e}N_{3es}$ and the product $N_{5e}N_{5es}$ indicates its relationship to the fundamental product.

In another stator employing the same 30-frame, 24-slot, two-pole stator core member and winding configuration, the following distribution of main and starting winding coils was employed:

| $M_1$ | $M_2$ | $M_3$ | $M_4$ | $M_5$ | |
|---|---|---|---|---|---|
| 18 | 27 | 31 | 40 | 35 | $N_{1e}=59.79$ |

| $S_1$ | $S_2$ | $S_3$ | $S_4$ | |
|---|---|---|---|---|
| 20 | 36 | 45 | 60 | $N_{1es}=141.8$ |

With at least one side of the $M_1$ thru $M_5$ main coils compacted to approximately a 90% space factor before placement of the starting winding coils $S_1$ thru $S_4$, the following winding harmonics were found:

| Percent $N_{3e}$ | Percent $N_{3es}$ | (Percent $N_{3e}$ × Percent $N_{3es}$) |
|---|---|---|
| 1.61 | −9.5 | −15.3 |

| Percent $N_{5e}$ | Percent $N_{5es}$ | (Percent $N_{5e}$ × Percent $N_{5es}$) |
|---|---|---|
| −.862 | −1.11 | .957 |

Here, it will be seen that the product $N_{3e} \times N_{3es}$ has been rendered still more negative and that the product $N_{5e} \times N_{5es}$ has been rendered still more positive, the resulting locked rotor torque being 11.2 ounce-feet.

FIG. 3 shows the comparison of the locked rotor torque for the stator described above (curve A) providing an average of 10.1 ounce-feet and with the same stator having uncompacted main windings described above indicated providing 8.8 ounce-feet (curve B).

It will be seen that the number of turns of wire in each of the phase windings, e.g., main and starting winding coils, is preselected so that the algebraic product of the third harmonic effective main and starting winding turns is in the range from a relatively small positive number to a relatively large negative number, as compared with the corresponding uncompacted main winding, and likewise that the algebraic product of the fifth harmonic effective main and starting winding turns is in the range from a relatively small negative number to a relatively large positive number, again in comparison with the corresponding uncompacted main winding. It will be seen that the slots 14 which are shared by sides of main and starting winding coils are substantially filled with wire, compaction of at least one side of the main winding coils in the shared slots thus permitting the employment of more turns on the smaller pitched coils of the main windings while still accommodating the requisite number of turns of the starting winding coils. This revised main winding distribution made possible by a compaction of the main winding coil sides results in a more positive main winding third harmonic space MMF which produces a more positive six-pole torque when combined with the negative third harmonic starting winding space MMF, a similar effect likewise being provided in the case of the fifth order harmonic field. I have found that the effect of this revised main winding distribution and the performance of the motor at other than low speeds is very small, and in particular that there is little effect upon the third harmonic dip.

Referring again to FIG. 1 of the drawings, it will be seen that for the non-quadrature winding distribution of the illustrated exemplification, the sides of the main winding coils $M_1$ and $M_2$ would share slots. The main coils in 14a and 14e usually do not require compaction. 14b and 14f with sides of start winding coils $S_4$ and $S_3$, respectively, are compacted, and that the sides of main winding coils $M_3$ and $M_4$, would share slots 14h and 14j with the sides of start winding coils $S_2$ and $S_1$, respectively, are likewise compacted. Of course, stators having quadrature type winding distributions (i.e., approximately 90 electrical degrees between radial centerlines for adjacent poles of different phases), can also readily incorporate the present invention and obtain the same advantages mentioned above in connection with the illustrated embodiment.

Generally speaking in order to derive unusually good benefits from the present invention, the turns should be distributed as already discussed and at least one side of the main winding coils sharing slots with coil sides of the auxiliary winding, especially the intermediate coils of the main winding poles, should be compacted in the slots at least to an 80% slot space factor. If desired, of course, all main winding coil sides could be compacted to provide the at least 80%. This would be quite advantageous when it is desired to provide an unusually high number of turns in the outermost coils of each main winding pole which do not normally share slots with sides of auxiliary winding coils. The outermost coils for a given pole could be divided into two or more coil sections connected in series, with the first section initially being placed into the slots, compacted and then the second section being disposed into the same slots to obtain an unusually high slot space factor, among the other benefits. This latter approach also has the advantage of permitting the use of different materials (e.g., copper and aluminum) for the two coil sections in the same slot. By using aluminum for the first placed coil section and incorporating a greater number of turns in that section than in the second one which may be formed of copper, lower compacting pressures may be employed in the particular slots while realizing economies in the manufacture of the stator without adversely affecting the rated performance of the unit. Also, of course, for some applications where the second phase winding, for instance an auxiliary winding, is placed in the core slots prior to the main winding (e.g., an inverted winding arrangement), at least one coil side of the auxiliary winding rather than those of the main winding would be provided with the at least 80% slot space factors.

Thus, while there have been described above the principles of this invention in connection with a specific embodiment, it is to be clearly understood that this description is made only by way of example and not as a limitation to the scope of the invention.

What I claim as new and desire to secure by Letters Patent of the United States is:

1. A method of manufacturing a stator assembly having a magnetic core formed with slots carrying at least first and second phase windings displaced in phase, with each winding including a plurality of coils formed of a preselected number of turns of wire to provide a predetermined number of angularly spaced apart poles, the method comprising the steps of: arranging the at least first and second phase windings in the slots of the core, with at least one side of certain coils of the second phase winding sharing the same slots with at least one side of certain coils of the first phase winding, and with the number of turns of wire in each of the coils being preselected so that the algebraic product of the third harmonic effective first and second phase winding turns is in the range from a relatively small positive number to a relatively large negative number; and prior to the arranging of the second phase winding in the slots, compacting the at least one side of certain coils of the first phase winding by the application of forces of sufficient magnitude to provide a space factor for the at least one side of at least 80%.

2. The method of claim 1 in which the step of arranging includes the distributing coils of different pitches concentrically in the poles of the at least first and second phase windings, with the preselected turns of the coil of smallest pitch in the first phase winding poles being fewer in number than the turns in the coil of greatest pitch in the same poles; and the compacting the at least one side of certain coils of the first phase winding includes the application of generally radial forces in slots carrying the at least one side of certain coils in the order of 6,500 pounds per square inch or above to attain the space factor of at least 80%.

3. The method of claim 1 in which the step of arranging includes the distributing coils of different pitches concentrically in the poles of at least one of the windings with the turns being progressively greater in number from the coil of smallest pitch to at least the coil of next-to-greatest pitch.

4. A method of manufacturing a stator assembly for use in an induction motor, the stator assembly having a slotted magnetic core member carrying a first phase winding in predetermined ones of the slots and forming a predetermined number of first phase winding poles and carrying a second phase winding in predetermined ones of said slots and forming the same predetermined number of second phase winding poles respectively angularly displaced from the first phase poles by a predetermined amount, the method comprising the steps of: distributing turns of wire in the slots to provide a plurality of concentric coils of different pitches in the phase winding poles, with at least one side of certain coils of the respective first phase winding poles sharing the same slot as at least one side of coils of the second phase winding poles, with the number of turns in the coils being preselected so that in the formula:

$$\Delta LRT = \frac{-K_3 N_{3e} N_{3es} + K_5 N_{5e} N_{5es} - \ldots + \sin\left(\frac{n}{2}\right)}{K_n K_{ne} K_{nes}}$$

where:

$\Delta LRT$ = change in locked rotor torque
$n$ = order of harmonic
$K_n$ = positive constants, functions of $n$, for a given design
$N_{ne}$ = effective first phase winding turns for the $n^{th}$ harmonic
  $= M_1 \sin n\alpha_1 + M_2 \sin n\alpha_2 + \ldots M_p \sin n\alpha_p$
$M_p$ = number of turns in the respective first phase coil
$\alpha_p = \frac{1}{2}$ the coil pitch angle of the respective first phase coil in fundamental electrical degrees
$N_{nes}$ = effective second phase winding turns for the $n^{th}$ harmonic
  $= S_1 \sin n\sigma_1 + S_2 \sin n\sigma_2 + \ldots S_q \sin n\sigma_q$
$S_q$ = number of turns of the respective second phase coil
$\sigma_q = \frac{1}{2}$ the coil pitch angle of the respective second phase coil in fundamental electrical degrees, the factor $K_3 N_{3e} N_{3es}$ is a minimum and the factor $K_5 N_{5e} N_{5es}$ is a maximum; and prior to distributing the second phase winding in the slots, compacting the at least one side of certain coils of the first phase winding by forces at least approximately 6,500 pounds per square inch as such certain coils are disposed in the slots to effect a space factor of at least 80%.

5. The method of claim 4 in which the turns distributed for the second phase winding are less in number for the coil of smallest pitch in the poles than the number for the coil of greatest pitch in the same pole.

6. The method of claim 4 wherein the compacting of the at least one side of certain coils of the first phase winding is accomplished by applying generally radially forces of at least 11,000 pounds per square inch to provide a space factor of at least 80% in the given slot.

References Cited

UNITED STATES PATENTS

| | | | |
|---|---|---|---|
| 3,200,317 | 8/1965 | Brammerlo | 318—220 |
| 3,333,329 | 8/1967 | Linkous | 29—596 |
| 3,348,183 | 10/1967 | Hodges et al. | |
| 3,402,462 | 9/1968 | Walker et al. | 29—596 |

JOHN P. CAMPBELL, Primary Examiner

C. E. HALL, Assistant Examiner

U.S. Cl. X.R.

29—605